United States Patent [19]

Labat et al.

[11] Patent Number: 4,924,061

[45] Date of Patent: May 8, 1990

[54] MICROWAVE PLASMA TORCH, DEVICE COMPRISING SUCH A TORCH AND PROCESS FOR MANUFACTURING POWDER BY THE USE THEREOF

[75] Inventors: Jean-Luc Labat, Ibaraki, Japan; Lahcen Ougarane, Elancourt, France; Michel Gastiger, Orsay, France

[73] Assignee: L'Air Liquide, Societe Anonyme Pour L'Etude et L'exploitation des procedes Georges Claude, Paris, France

[21] Appl. No.: 204,866

[22] Filed: Jun. 10, 1988

[30] Foreign Application Priority Data

Jun. 10, 1987 [FR] France ............................... 87 08096

[51] Int. Cl.[5] ............................................... B23K 9/00

[52] U.S. Cl. ........................ 219/121.52; 219/10.55 R; 219/121.51; 219/121.48; 315/111; 315/21

[58] Field of Search ...................... 219/121.36, 121.43, 219/121.52, 121.48, 121.51, 75, 10.55 A, 10.55 R; 156/643, 646; 315/111.21

[56] References Cited

U.S. PATENT DOCUMENTS

| | | | |
|---|---|---|---|
| 4,065,369 | 12/1977 | Ogawa et al. | 219/121.43 |
| 4,101,411 | 7/1978 | Suzuki et al. | 219/121.52 |
| 4,207,452 | 6/1980 | Arai | 219/10.55 A |
| 4,208,806 | 6/1980 | Manser et al. | 219/10.55 A |
| 4,423,303 | 12/1983 | Hirose et al. | 219/121.43 |
| 4,711,983 | 12/1987 | Gerling | 219/10.55 A |

FOREIGN PATENT DOCUMENTS

| | | |
|---|---|---|
| 2336050 | 2/1975 | Fed. Rep. of Germany . |
| 3134501 | 8/1983 | Fed. Rep. of Germany . |

OTHER PUBLICATIONS

"Der Mikrowellen-Plasmabrenner", *Elektronische Rundschau,* vol. 13, No. 11, Nov. 1959, by W. Schmidt, pp. 404-406.

*Primary Examiner*—M. H. Paschall
*Attorney, Agent, or Firm*—Young & Thompson

[57] ABSTRACT

The microwave torch comprises at least one gas supply conduit (1, 2); a resonant cavity (3) forming around the conduit a sleeve open adjacent to the outlet of the conduit and including a lateral opening (4); a transition coaxial structure perpendicular to the sleeve comprising, on one hand, an outer tube (5) connected to the lateral opening (4) of the sleeve and, on the other hand, an inner element (6) having one end (20) in contact with the conduit and an opposite end which is in contact with the outer surface of a wave guide (8) and carries a transition member (7) disposed in the wave guide; said wave guide supplying microwave energy and having a rectangular section and perpendicular to the coaxial structure (5, 6) being provided with an opening (27) where the outer tube (5) of the coaxial structure is connected; shielding gas supply means in the wave guide and/or the coaxial structure and/or the sleeve; optionally tuning means; and optionally plasma igniting means.

7 Claims, 4 Drawing Sheets

MICROWAVE PLASMA TORCH, DEVICE COMPRISING SUCH A TORCH AND PROCESS FOR MANUFACTURING POWDER BY THE USE THEREOF

The present invention relates to a microwave plasma torch and to a device and a process for manufacturing powder for the use of said torch.

It is known to prepare powders by reaction of reagent gases within a plasma. However, these processes usually consume an excessive amount of energy.

The present invention provides a microwave plasma torch comprising at least one gas supply conduit; a resonant cavity forming around said conduit a sleeve open adjacent to the outlet of said conduit and including a lateral opening; a transition coaxial structure perpendicular to the sleeve and comprising, on one hand, an outer tube connected to the lateral opening of the sleeve, and, on the other hand, an inner element having one end in contact with said conduit and an opposite end in contact with the inner surface of a wave guide and carrying a transition member disposed in the wave guide; said wave guide supplying microwave energy having a rectangular section and perpendicular to the coaxial structure being provided with an opening to which the outer tube of said structure is connected; means for supplying sheathing gas to the wave guide and/or the coaxial structure and/or the sleeve; optionally tuning means; and optionally plasma igniting means.

A better understanding of the invention will be had from the accompanying drawings in which.

Figure 1:
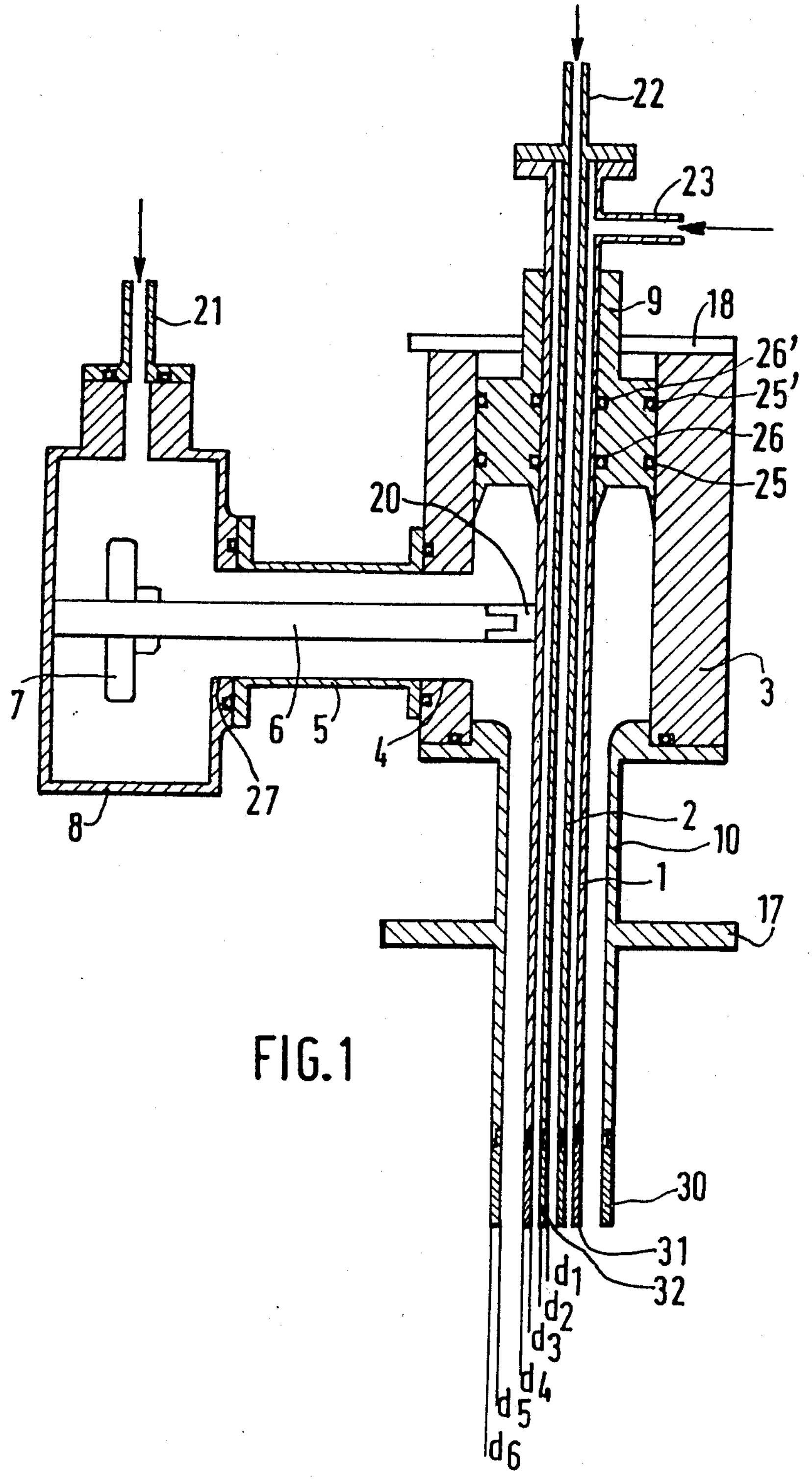
FIG. 1 is a side elevational view of a torch according to the invention in its plane of symmetry.
Figure 2:
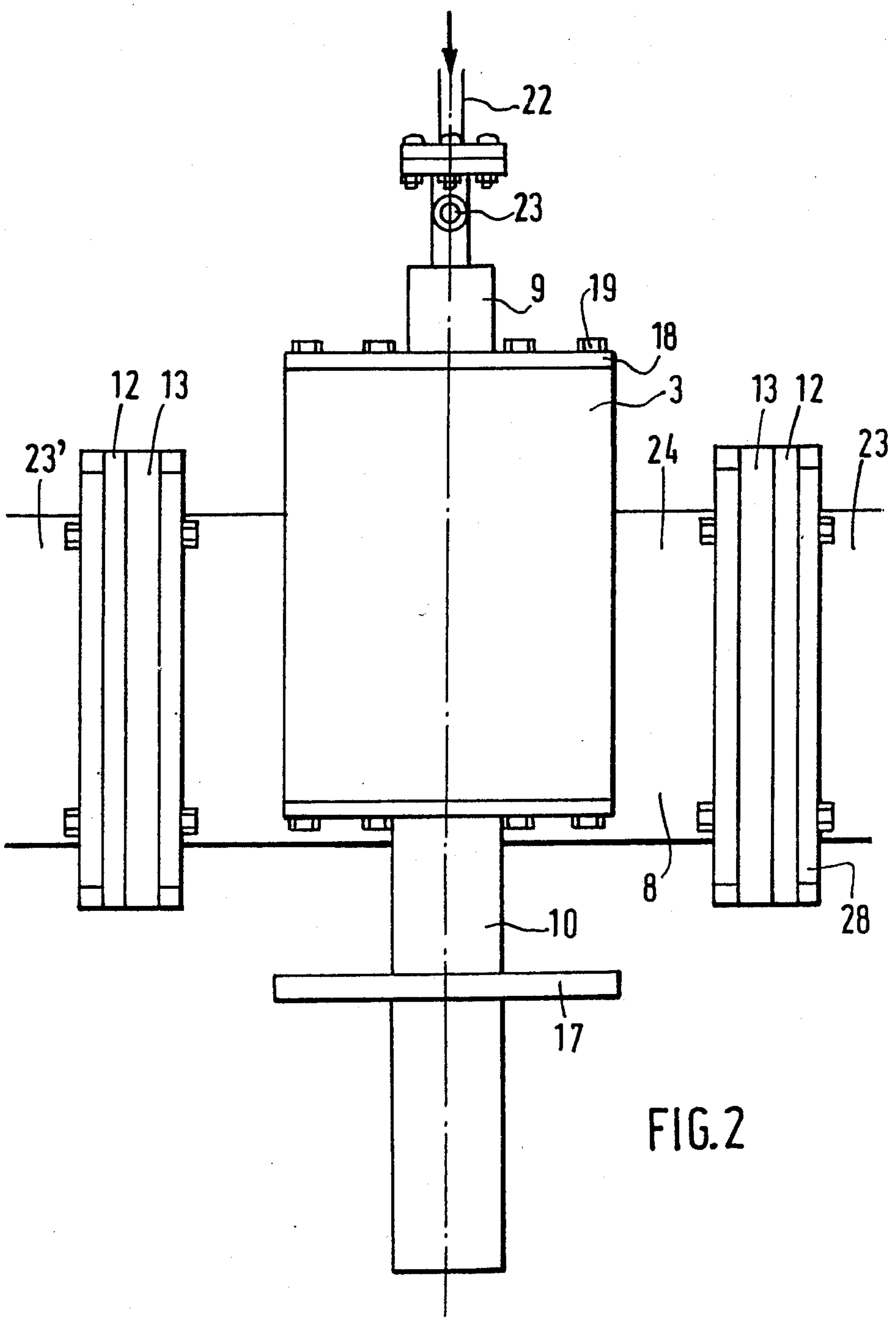
FIG. 2 is a front elevational view of the torch.
Figure 3:
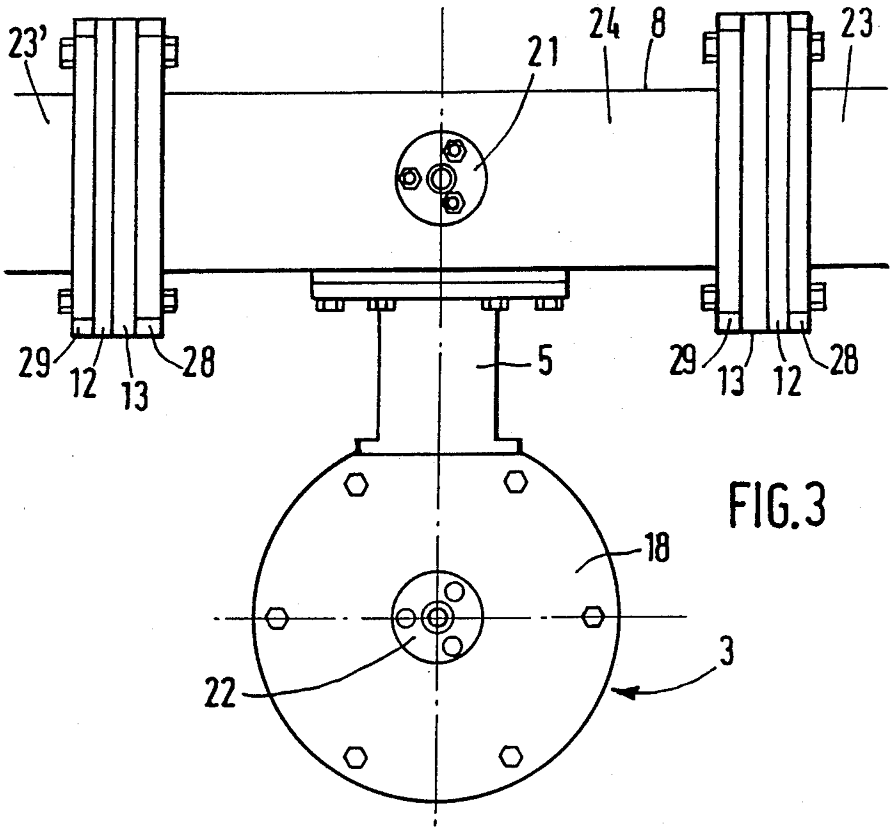
FIG. 3 is a top plan view of the torch.

FIGS. 1, 2 and 3 show a coaxial gas supply conduit, the inner conduit 2 conveying the active gas introduced through the end 22 connected to a source of gas (not shown). Supplied through the transverse conduit 23 connected to a source of plasma-creating gas (not shown) is the gas flowing in the outer conduit 1 of conductive material. The coaxial conduit 1, 2 is surrounded by a cylindrical metal sleeve 3 having the same axis and defining a resonant cavity closed adjacent to the inlet of the gases by an annular flange 18 fixed to the sleeve 3 by screws 19. Extending through this flange 18 is a hollow rod having a outer screw thread on which the flange is screwed, this rod pertaining to a piston 9 slidably mounted in the sleeve 3, the conduit 1 extending through this hollow rod. O-ring seals 25, 25', 26 and 26' provide the gas-tightness.

The sleeve 3 includes a lateral opening 4 to which is fixed in a position perpendicular to the sleeve and with a sealed joint the outer metal tube 5 of the coaxial transition structure. The inner metal element 6 disposed on the axis of the coaxial structure is, on one hand, in contact with the outer conduit 1, the contact being achieved through a detachable contact member 20 and, on the other hand, in contact with the inner surface of the wall of the wave guide 8 having a rectangular section opposed to the circular opening 27 where the outer tube 5 of the coaxial structure is connected in a sealed manner. The wave guide 8 is perpendicular to the coaxial structure and to the axis of the conduit and sleeve 3. The inner element 6 is provided with a tuning member 7 which is not necessarily fixed in position.

Opening into the wave guide 8 is a pipe 21 supplying sheathing gas. The sleeve 3 forming the cavity is extended by the sleeve 10 extending around the conduit 1 and carrying a fixing flange 17.

Also shown in FIG. 2 on the wave guide 8 are the central portions 24 and the lateral portions 23—23', the double flanges 12-13 fixed between the flanges 28 and 29 respectively rigid with the portions 23—23' and 24 of the wave guide 8.

Figure 4:
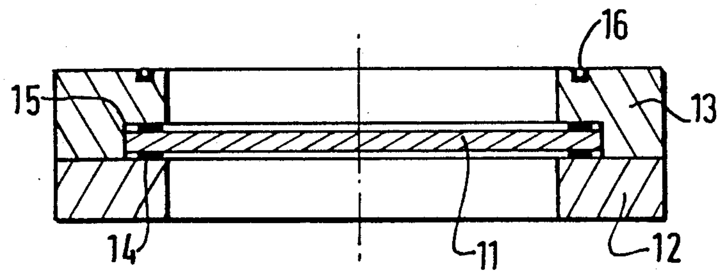
FIG. 4 is a sectional view of the gas-light window.

FIG. 4 shows the structure of the windows each comprising two rectangular metal flanges 12 and 13 which surround in a recess 15 a window 11 which is transparent to the waves, for example of quartz.

The gas-tightness is ensured by silicon seals 14 disposed between the window 11 and the confronting surfaces of the flange 12 and the recess of the flange 13. The latter further comprises a groove 16 in which is disposed a retangular metal seal which ensures the gas-tightness of the central portion 24 of the wave guide 8 by contact with the flange 28.

Preferably, the edges and the sharp corners are rounded so as to avoid the arcing of the plasma.

In a modification (not shown), only the conduit 1 extends through the centre of the flange 18, and the piston 9 inside the sleeve and without its rod is displaced in the sleeve by one or more rods extending through the flange 18.

In another modification (not shown), the sheathing gas is introduced in the sleeve 3 or 10. The gas-tightness in the torch may be ensured by a member disposed in the coaxial structure for example. The windows 12, 13 are then unnecessary.

Further, the gas-tight means are unnecessary in some applications of these torches.

On the other hand, a good electric contact is necessary between all the conductive parts which guide the microwaves. For this purpose, their perfectly conductive junction between the metal parts joined by flanges may be ensured by copper or indium joints.

In a modification (not shown), the coaxiality of the conduits 1 and 2 is ensured by means of points or a metal spring disposed between the two conduits.

The gas supply conduit is not necessarily coaxial and may be formed by merely one conduit.

The length of the conduits 1 and 2 may be modified in line by sliding along the axis. These lengths and the length of the sleeve may be moreover modified by the addition of terminal elements 30, 31, 32 screwed on their end and interchangeable.

Depending on the application of the torch, these terminal elements can be chosen in a material adapted to the products treated in the torch; i.e. highly conductive with high melting point and preferably refractory for the sleeve and the outer conduit, eventually also refractory for the conduit 2 and non necessarily conductive.

Preferably, the end of the conduits 1, 2 and of the sleeve 10 or of the terminal elements screwed on their end is rounded.

The present invention also provides a fluid-tight device for manufacturing powder which employs a torch according to the invention and further comprises a microwave generator, a microwave plasma torch, a reactional enclosure, means for supplying reactive gas, plasma-creating gas and a shielding gas, means for separating powder and the gases, means for collecting the powders, and means for discharging the effluent gases.

In addition to the resonant cavity 43, the sleeve 40 and the wave guide 48 which correspond to the cavity 3, to the sleeve 10 and to the wave guide 8 shown in the preceding figures, the device comprises a microwave generator 41 connected by conventional means to the wave guide 48. It further comprises a shielding gas supply pipe 42, a reactive gas supply pipe 47 and a plasma-creating gas supply pipe 46. Tuning means, for example pistons, may be provided on the wave guide. Other conventional tuning means may also be envisaged.

The sleeve 40 opens into and extends beyond by a distance $d_1$ the reactional enclosure 53 having a length L and a diameter D, whose opposite end has a conical shape whose included angle is preferably about 20°.

According to the invention, the ratio L/D is between 1.5 and 6 and preferably between 2 and 4.

In order to avoid contamination of the powders by the material of the wall of the enclosure, the latter may be electropolished or provided with a quartz lining.

The reactional enclosure opens into a powder and gas separator formed by a cylindrical metal filter 50 surrounded by a fluid-tight sleeve 49 and connected to a gas discharge conduit 52. Disposed at the outlet of the cylindrical filter 50 is a powder collector 51. Valves, a purging gas supply 56 and a vacuum-creating conduit 55 are also provided to facilitate the changing of the collector without contaminating the powders. Other conventional means for separating powder and gas may also be envisaged.

The igniting device 54 ignites the plasma by electric contact with the gas conduit.

The plasma igniting means are not necessarily chosen as shown. They may be formed by any conventional igniting means in the region of the end of the conduit, by any exterior means compatible with the structure of the enclosure. It may be in particular formed by a metal wire which is inserted in the conduit 2 and may or may not be removable when the plasma has been ignited.

Figure 5:
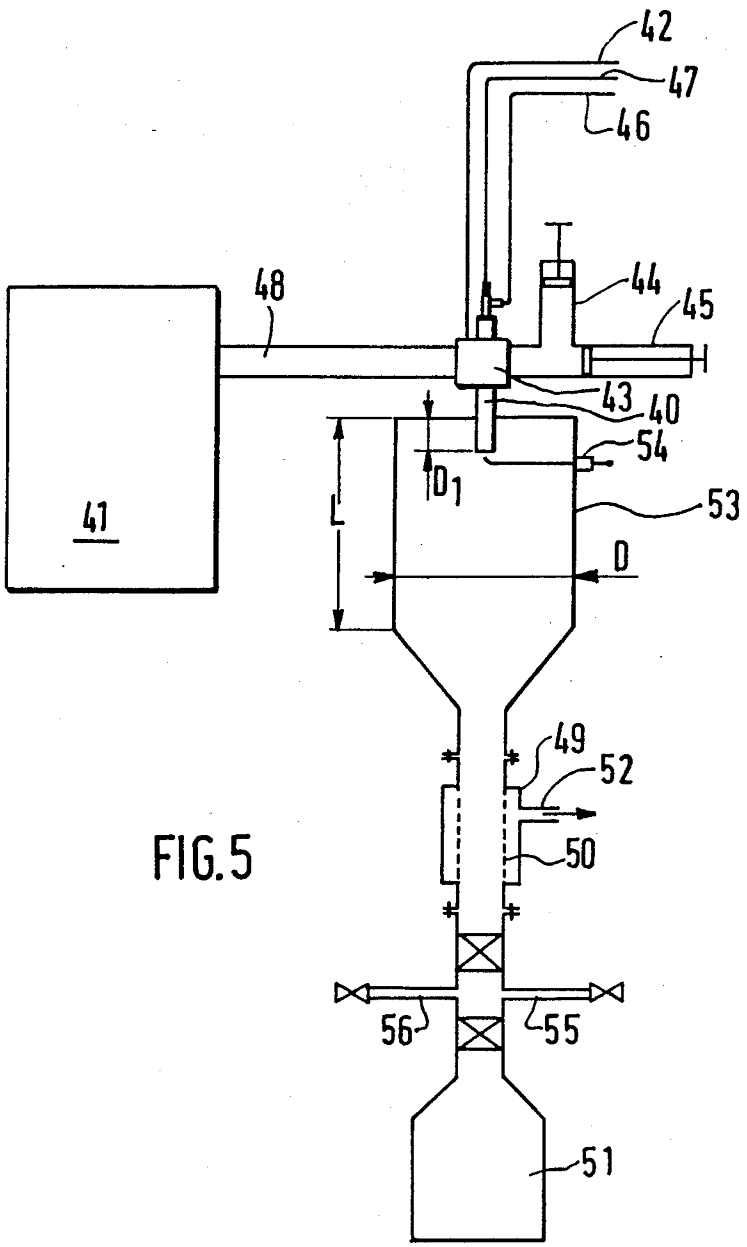
FIG. 5 is a diagrammatic view of a device according to the invention.

In another embodiment (not shown), the shielding gas may be introduced in the region of the sleeve 40 or of the cavity 43 or of the coaxial (which is not shown in FIG. 5) and the plasma-creating gas through the inner element of the coaxial transition which in this case opens into the outer conduit 1 for conducting the plasma-creating gas thereto.

In another embodiment, other conventional means may be provided for recovering the powders and the gases at the outlet of the reactional enclosure. The residual gases may be separated, destroyed in respect of certain toxic gases and recycled in respect of other gases (plasma-creating gas, shielding gas).

In another embodiment, the torch in which the gases, in the configuration here represented, flow in the downward direction, may be oriented in a different way, for example in the upward direction.

The device according to the invention is applicable in particular in the synthesis of powder, this is why the present invention also concerns a process for preparing powder wherein a device according to the invention is employed and the reactive gas is chosen from the silanes, ammoniac, the boron hydrides, the halogenides of tungsten and titanium, oxygen and the organometallic gases and mixtures thereof.

The process according to the invention is in particular applicable to the preparation of powder based on silicon, namely silicon, silica, silicon carbide and nitride powder.

The reactive gas is then chosen in accordance with the invention from the silanes and polysilanes, halogeno silanes, alkylsilanes and mixtures thereof with oxygen and ammoniac.

The shielding gas flows in fine wherever the supply conduit is located, between the sleeve and the outer conduit 1. Any conventional shielding gas may be employed, and in particular inert gases such as for example nitrogen or hydrogen.

The plasma-creating gas employed is a conventional plasma-creating gas, in particular argon.

It is injected and flows in the outer conduit. The active gas flows in the inner conduit or in the single conduit when this embodiment is employed. In this case, plasma-creating gas may be injected upon ignition and then replaced by or mixed with active gas.

According to the invention, the pressure utilization is on the order of atmospheric pressure or higher than the latter, up to about 5 atmospheres.

The term "microwave" is intended to mean the band between about 400 and 12,000 MHz.

EXAMPLE 1

The applicant has carried out the invention under the following conditions:

L/D =2.5; $D_1$ between D/4 and 3 D/4 and preferably 0.4 D.
$D/d_1$ =between 40 and 150, and preferably 100.
$d_1$ =2 mm (inside diameter of the conduit 1).
$d_2$ =4 mm (outside diameter of the conduit 1).
$d_3$ =7.5 mm (inside diameter of the conduit 2).
$d_4$ =12 mm (outside diameter of the conduit 2).
$d_5$ =27 mm (inside diameter of the sleeve 10).
$d_6$=33 mm (outside diameter of the sleeve 10).
the conduit 2 has a quartz terminal member.
the conduit 1 has a tungsten terminal member.
the sleeve 10 has a brass terminal member.
the reactor is composed of 360 L stainless steel (the internal reference temperature is 440° C.).
reactive gas: $SiH_4$ 7 1/mn
plasma-creating gas: Ar 3 1/mn
shielding gas: $N_2$ 11 1/mn
u-wave power: 2.5 Kw
production =490 g/h of silicon powder, namely an energetic yield of 5.15 Kwh/kg of powder and 7.90 electric KWh/kg of powder (100% conversion, efficiency of the generator 66%).

A monocrystal was drawn from the powders obtained in this way. The analysis of the monocrystal has revealed 7 $10^{17}$ atoms/cu.m. of oxygen and 10 $10^{17}$ atoms/cu.m. of carbon.

EXAMPLE 2

With same reactor and the following flows:
$SiH_4$ 9.5 1/mn.
Ar 3 1/mn.
$N_2$ 14 1/mn.

For a power of 3.125 KW 665 g/h of silicon powder were obtained, namely a yield of 4.69 KWh u-wave/kg powder and 7.20 electric KW/h/kg powder (100% conversion).

EXAMPLE 3

With the same reactor (and d =25 mm) and the following flows:
SiH 12 1/mn.

Ar 2.5 1/mn.

$N_2$ 12 1/mn.

For a power of 3.2 KW, 840 g/h of silicon powder were obtained, namely a yield of 3.81 KW/kg of powder and 5.86 electric KWh/kg powder (98.3% conversion).

The diameters $d_1$ to $d_6$ are defined in FIG. 1.

We claim:

1. A microwave plasma torch, comprising: a hollow wave guide member for connection to a microwave energy generator, said wave guide member having a rectangular cross-section defining first and second opposite walls, and a first opening in said first wall; at least one gas supply conduit having an outlet; a resonant cavity-forming sleeve around said conduit, said sleeve being open adjacent to said conduit outlet and including a lateral opening; a transition coaxial structure perpendicular to said sleeve and comprising an outer tube connected to said sleeve lateral opening and to said first opening and an inner element extending through both said openings, said inner element having one end in contact with said conduit and an opposite end which is in contact with said second wall and which carries a transition member disposed in said wave guide member; said wave guide member being substantially perpendicular to said coaxial structure; and shelding gas supply means for supplying shielding gas into at least one of said wave guide member, said coaxial structure and said sleeve; wherein said outer tube is connected in a sealed manner to at least one of the lateral opening and said first opening; wherein the wave guide member is connected to a source of shielding gas and is provided on each side of said first opening with windows being connected in a sealed manner; wherein said sealed windows are conductive and comprise a rectangular window composed of a material which is transparent to the microwaves, two rectangular flanges surrounding said rectangular window, first gas-tight means between the window and the flanges, and second gas-tight means between that one of the two flanges which is in facing relation to a portion on the wave guide member having said first opening and said portion; wherein the sleeve is connected to a source of shielding gas and a coaxial structure is provided with gas-tight means; and wherein said wave guide is supplied with shielding gas.

2. A plasma torch according to claim 1, wherein the gas supply conduit is coaxial.

3. A plasma torch according to claim 1, wherein the lengths of the gas supply conduit and of the outlet of the sleeve are adjustable.

4. A plasma torch according to claim 1, wherein the end of the gas supply conduit and the end of the outlet of the sleeve are rounded.

5. A plasma torch according to claim 1, wherein the transition member is adjustable.

6. A plasma torch according to claim 2, wherein the supply conduit is coaxial, the inner conduit being formed at least partly by a refractory material.

7. A microwave plasma torch, comprising: a hollow wave guide member for connectionn to a microwave energy generator, said wave guide member having a rectangular cross-section defining first and second opposite walls, and a first opening in said first wall; at least one gas supply conduit having an outlet; a resonant cavity-forming sleeve around said conduit, said sleeve being open adjacent to said conduit outlet and including a lateral opening; a transition coaxial structure perpendicular to said sleeve and comprising an outer tube connected to said sleeve lateral opening and to said first opening and an inner element extending through both said openings, said inner element having one end in contact with said conduit and an opposite end which is in contact with said second wall and which carries a transition member disposed in said wave guide member; said wave guide member being substantially perpendicular to said coaxial structure; and shielding gas supply means for supplying shielding gas into at least one of said wave guide member, said coaxial structure and said sleeve; wherein the closed end of the sleeve is an annular flange through which extend in a sealed manner means for regulating an annular piston, the gas supply conduit extending through said flange and said piston.

* * * * *